United States Patent [19]
Katoh

[11] 3,766,329
[45] Oct. 16, 1973

[54] DEVICE FOR CUTTING OFF THE SIGNAL IN A RECORDING TAPE RECORDER AT THE END OF RECORDING

[75] Inventor: Shigeo Katoh, Asahi-ku, Yokohama City, Kanagawa-ken, Japan

[73] Assignee: Victor Company of Japan Ltd., Kanagawa-ken, Japan

[22] Filed: May 24, 1972

[21] Appl. No.: 256,513

[30] Foreign Application Priority Data
May 25, 1971 Japan ....... 46/43098 (utility model)

[52] U.S. Cl. ................... 179/100.2 R, 179/100.2 K
[51] Int. Cl. ........................................... G11b 15/12
[58] Field of Search .............. 179/100.2 K, 100.2 R

[56] References Cited
UNITED STATES PATENTS
3,480,739 11/1969 Kinkel ......................... 179/100.2 K
3,019,302 1/1962 Westerfeld et al. .......... 179/100.2 R

*Primary Examiner*—Bernard Konick
*Assistant Examiner*—Robert S. Tupper
*Attorney*—Holman & Stern

[57] ABSTRACT

A device for cutting off a recording signal at the end of a recording operation in a cartridge type tape recorder, which device operates at the time of stopping of a recording operation to cause a variation in the frequency characteristic of a trap circuit for trapping a high-frequency bias and inserted in a recording signal transmission path, thereby to cut off the recording signal.

4 Claims, 5 Drawing Figures

DEVICE FOR CUTTING OFF THE SIGNAL IN A RECORDING TAPE RECORDER AT THE END OF RECORDING

BACKGROUND OF THE INVENTION

This invention relates to a device for cutting off a recording signal at the end of a recording operation in a cartridge type tape recorder, and more particularly to a recording stopping device capable of instantaneously stopping the recording operation of a tape recorder wherein use is made of a magnetic tape accommodated within a cartridge.

In general, in a tape recorder in which is used an endless magnetic tape contained within a cartridge, and which is commonly referred to as a cartridge type tape recorder, it is difficult to provide a mechanism for causing a pinch roller to separate from the tape as in other types of tape recorders such as the open-reel type and the cassette type tape recorders, and it is impossible to stop instantaneously the travel of the tape in order to stop the recording operation.

For this reason, it is necessary at the time of stoppage of recording to cut off the signal to be supplied to the recording head in order to prevent recording of surplus signals after stopping operation of recording.

In one typical recording stopping device of this character known heretofore, a switch is provided between the input terminal of a recording amplifier and a ground terminal, and by closing this switch, the input terminal of the recording amplifier is grounded to short-circuit the recording signal, which is thereby prevented from being supplied to the recording head. In another known device for stopping recording, a switch is provided between the two terminals of the recording head, and by closing this switch, the recording head is short-circuited thereby to prevent the recording signal from being supplied to the recording head.

These conventional devices have been entirely unsatisfactory, however, for the following reasons. In the former conventional device, since a capacitor for blocking flow of current through the amplifier is grounded when the switch is closed, noise is produced by the influence of leakage current of this capacitor. In the latter conventional device, since a high-frequency bias current being supplied to the recording head is also short-circuited when the switch is closed, the amplitude of the high-frequency bias current flowing through the recording head decreases abruptly from a steady state, and, as a result, noise is generated by the resulting hysteresis of the magnetic tape. Thus, in both of these known devices, a noise signal is recorded immediately after the recording stopping operation is performed.

SUMMARY OF THE INVENTION

Accordingly, the principal object of the present invention is to provide a recording stopping device in which the difficulties accompanying known devices as described above are overcome, and which is capable of stopping recording without causing generation of noise in a cartridge-type tape recorder.

Another object of the invention is to provide a device of very simple organization which can stop recording and fulfill the objects of the invention.

Still another object of the invention is to provide a recording stopping device in which a bias trap circuit is utilized and adapted to operate for bias trapping at the time of ordinary recording and to operate for signal cut-off when recording is stopped.

The nature, utility, and further features of this invention will be apparent from the following detailed description with respect to a preferred embodiment of the invention when read in conjunction with the accompanying drawings, throughout which like parts are designated by like reference numerals.

DETAILED DESCRIPTION

Figure 1:
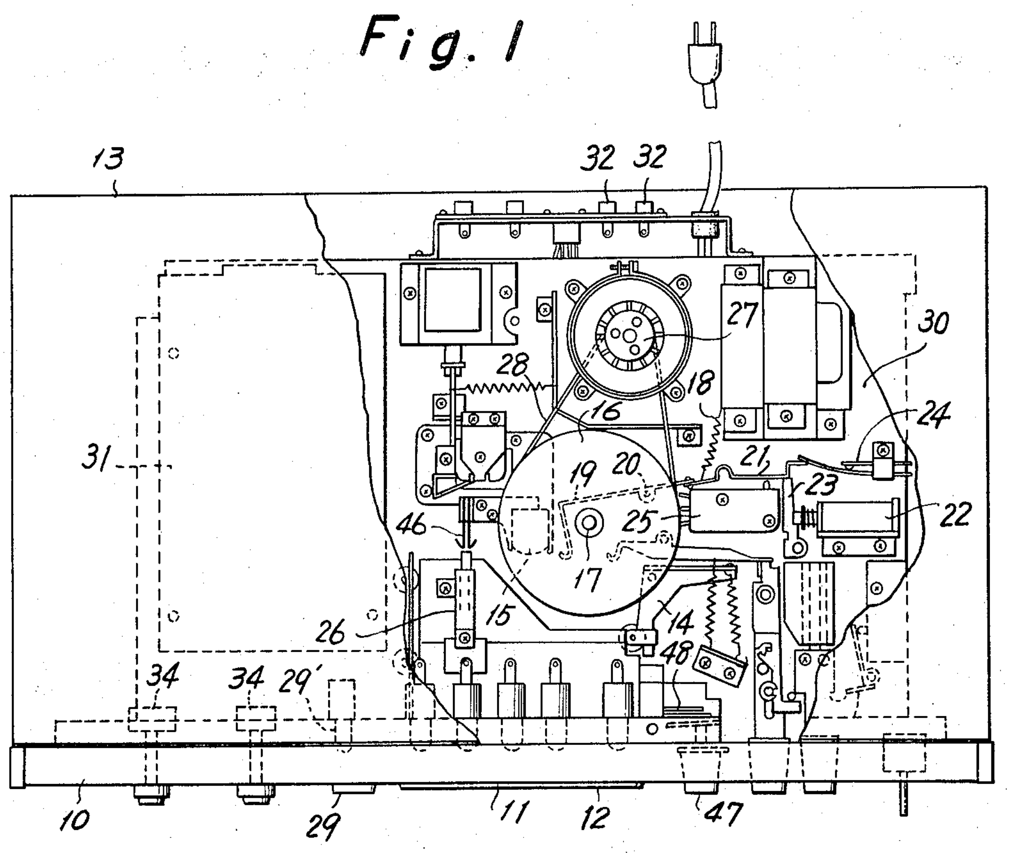
FIG. 1 is a plan view, with a part cut away, showing one embodiment of a cartridge-type tape recorder in which one embodiment of the recording stopping device according to the invention is applied.
Figure 2:
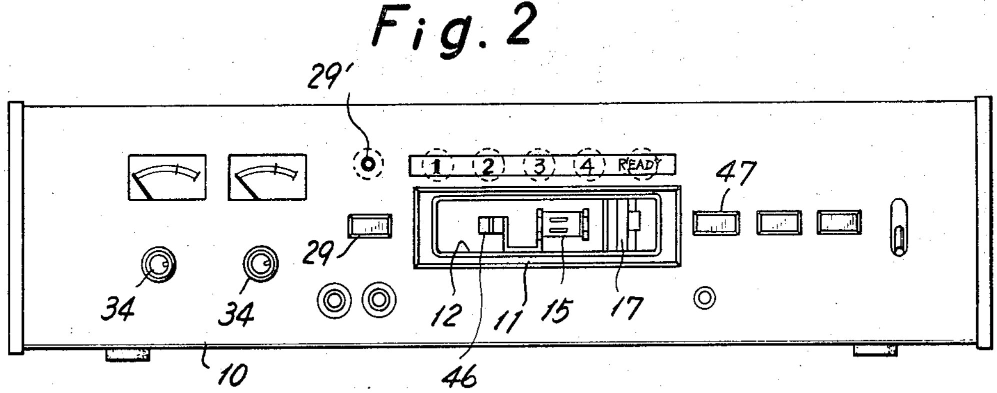
FIG. 2 is a front view of the tape recorder shown in FIG. 1.

FIGS. 1 an 2 illustrate a cartridge-type tape recorder incorporating a recording stopping device according to this invention.

Before the commencement of operation of the tape recorder, a cartridge (not shown) accommodating an endless tape is inserted into a space in the casing 13 of the tape recorder through a central aperture 12 of a cartridge entrance escutcheon 11 provided on a front panel 10 of the recorder.

Upon insertion of the cartridge to a predetermined position, it engages with a cartridge pressing lever 14. At the same time, the tape section of the cartridge comes into contact with a magnetic head 15; a pinch roller installed in the cartridge comes in pressure contact with a capstan 17 interlinked with a flywheel 16 installed in the recorder; and the tape begins to travel, held between the pinch roller and the capstan.

Further, a lever 19 depressed by the inserted cartridge casing and energized by a spring 18 starts to turn clockwise about a shaft 20. When the lever 19 turns, a leaf spring 21 connected to the lever 19 is urged to turn clockwise about the shaft 20. However, rotation of the leaf spring 21 is hampered by an engaging plate 23 connected to a solenoid 22 for driving an automatic stopping mechanism. Therefore, the leaf spring 21 merely stores mechanical energy necessary for rotation. Thus, both the switch 24 and the motor stopping switch 25 are kept closed.

The inserted cartridge casing causes a muting switch 26 to be switched to an operating state, which switch 26 is designed to short-circuit output terminals when the cartridge is not inserted so as to deliver no output to the outside.

On insertion of the cartridge, the rotation of a motor 27 is transmitted to the flywheel 16 and the capstan 17 by way of a driving belt 28, and the tape housed in the cartridge begins to travel since the tape is squeezed between the pinch roller installed in the cartridge and the capstan 17.

By depressing a record push button 29 under this condition, a record indicator lamp 29' is lit; an electrical circuit integrated in a baseplate 31 installed on a chassis 30 of the tape recorder is switched over to the recording mode; and a recording signal begins to be recorded by the magnetic head 15 on the tape in the cartridge.

Figure 3:
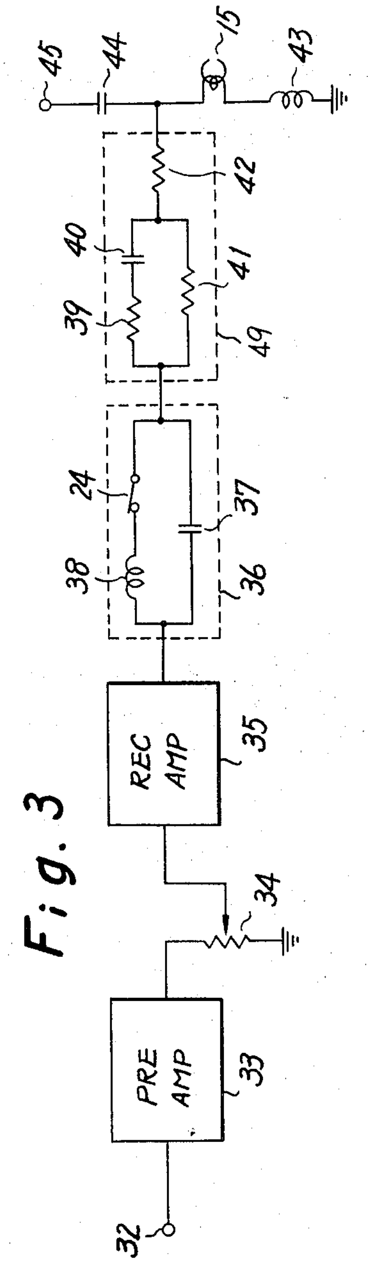
FIG. 3 is a block diagram showing the essential organization of the electrical circuitry of one embodiment of the device according to the invention.

FIG. 3 is a block diagram of an electrical circuit of a recording stopping device constituting an embodiment of this invention. It will be seen that an input terminal 32 is connected to the input side of a pre-amplifier 33, the output side of which is connected to one end of a variable resistor 34, and the other end of the variable resistor is grounded. A slidable contact of the variable resistor 34 is connected to the input side of a recording amplifier 35, while a high frequency bias trap circuit 36 is connected to the output end of the recording amplifier 35.

The trap circuit 36 is a parallel resonant circuit consisting of an inductor 38 and a capacitor 37. The junction of the inductor 38 and the capacitor 37 is connected to the output end of the recording amplifier 35. The other end of the inductor 38 is connected to the stationary contact of a switch 24. The movable contact of the switch 24 is connected to the other end of the capacitor 37, while the junction of the switch 24 and the capacitor 37 is connected to a constant current supply and tone quality control circuit 49.

The circuit 49 comprises three resistors 39, 41 and 42 and one capacitor 40, wherein a series circuit consisting of a resistor 39 and a capacitor 40 is connected in shunt with a resistor 41. The junction of the resistors 39 and 41 in this parallel circuit is connected to the junction of the switch 24 and the capacitor 37 in the trap circuit 36. The junction of the capacitor 40 and the resistor 41 is connected to one end of a resistor 42, and the other end of the resistor 42 is connected to one end of the magnetic head 15. The other end of the head 15 is grounded through a hum-back coil 43. Furthermore, the junction of the resistor 42 and the magnetic head 15 is connected to a high frequency bias input terminal 45 through a capacitor 44.

The operation of the electrical circuit of the above described circuit structure according to an embodiment of this invention will now be described.

A recording signal applied to the input terminal 32 undergoes amplification by the pre-amplifier 33 and is controlled to a predetermined level by the variable resistor 34. The amplified and level-controlled signal is fed to the recording amplifier 35 for further amplification.

The recording signal amplified by the recording amplifier 35 passes through the trap circuit 36 provided with a function as will be described hereinafter before entering the constant current supply and tone quality control circuit 49. The signal passed through the circuit 49 is furnished to the magnetic head as a tone quality controlled signal and as constant current supply source current.

On the other hand, a high frequency biasing signal incoming from the input terminal 45 is supplied to the magnetic head 15 through the capacitor 44 and superimposed upon the recording signal incoming from the constant current supply and tone quality control circuit 49 so that magnetic recording is performed, by use of the superimposed signal, on the tape (not shown) accommodated in the cartridge.

The trap circuit 36 is for preventing the high frequency biasing signal from entering into the recording amplifier 35 through the constant current supply and tone quality control circuit 49. The trap circuit 36 constitutes a parallel resonant circuit consisting of the inductor 38 and the capacitor 37 as mentioned previously, which presents a low impedance for an audio frequency band as a frequency range for the recording signal and a high impedance for the high frequency biasing signal frequency (which is approximately 55 KHz in this embodiment).

The switch 24 inserted in this circuit is connected in series with the inductor 38. In the ordinary recording mode, the switch 24 is closed. As a result, the trap circuit 36 operates as a normal trap circuit which permits the passage of the recording signal and blocks the passage of the high frequency biasing signal.

On releasing of the recording mode such as may occur when a sensor 46 shown in FIG. 1 is electrically short-circuited by a sensing tape attached to one end of the tape accommodated in the cartridge, or when a program select button 47 is depressed and a program select switch 48 is closed, a solenoid 22 for driving an automatic stopping mechanism shown in FIG. 1 is energized.

This causes the plate 23 attached to the solenoid to be displaced in the clockwise direction and the leaf spring 21 whose rotation has been impeded by the plate 23 to rotate clockwise around the shaft 20. By the rotation of this leaf spring 21, both the switch 24 and the motor stop switch 24 are opened. Although the motor power supply is interrupted in this manner, the motor 27 continues its rotation for a brief time interval because of the inertia of the flywheel 16.

Since the switch 24 in the trap circuit 36 shown in FIG. 3 is opened, the connection of the inductor 38 is cut off from the circuit 36, and the trap circuit 36 becomes the sole capacitor branch. Therefore, the trap circuit 36 presents a high impedance for the recording signal frequency band. Consequently, upon opening of the switch 24, the supply of a recording signal is interrupted by the trap circuit 36, and, hence, the output of the recording amplifier 35 fails to be supplied to the magnetic head 15, whereby magnetic recording is suspended.

Under this condition, only the frequency response of the trap circuit 36 is subject to change, and there arises no abrupt change in the amplitude of the high frequency biasing current fed to the magnetic head 11. Consequently, there is no possibility of occurrence of noise and of recording of noise signals on the tape.

Figure 4:
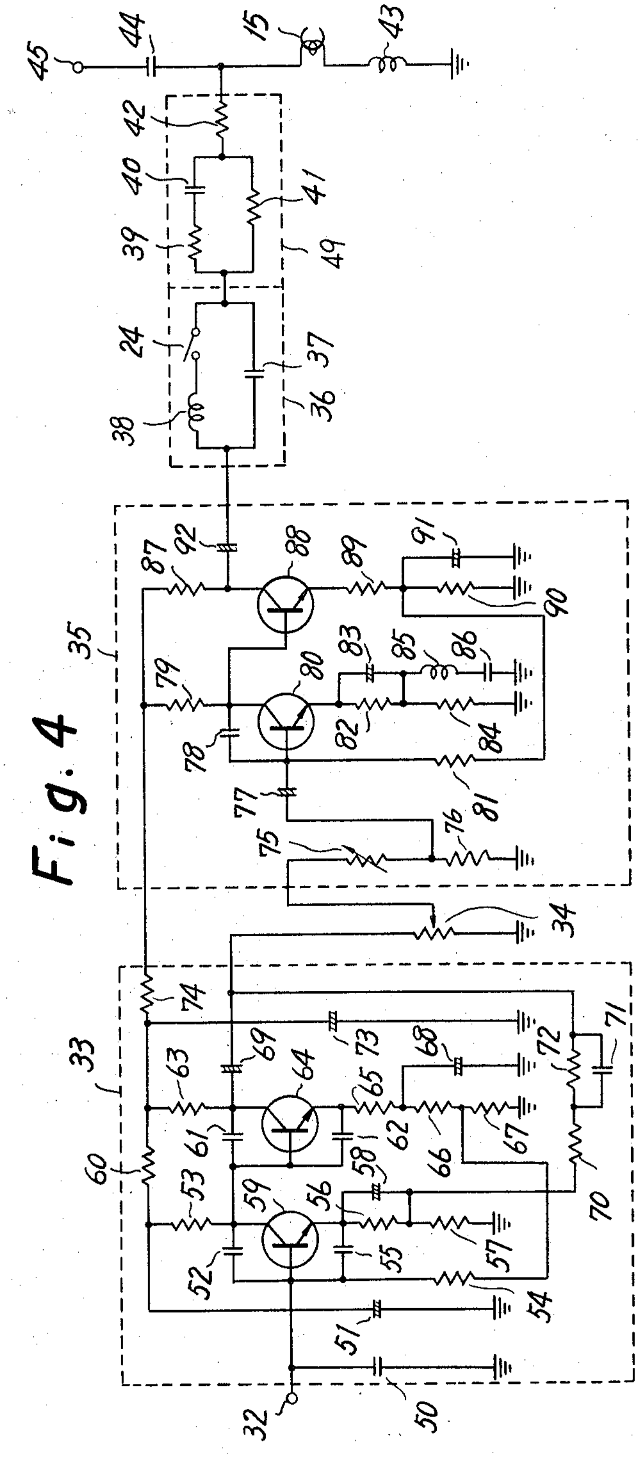
FIG. 4 is a circuit diagram showing a specific embodiment of the circuit indicated in FIG. 3.

FIG. 4 shows a detailed representation for an essential part of the electrical circuit for an embodiment of this invention, wherein the same numerals as those in FIG. 3 are used for identical or like component parts or circuit elements. The constants of the circuit elements in the circuit of FIG. 4 are as follows:

| Resistors: | Ω |
|---|---|
| 39 | 4.7 K |
| 41 | 68.0 |
| 42 | 3.3 |
| 53 | 56.0 K |
| 54 | 220.0 |
| 56 | 4.7 |
| 57 | 470 |
| 60 | 8.2 K |
| 63 | 5.6 |
| 65 | 100 |
| 66 | 2.2 K |
| 67 | 1.2 |

| | | |
|---|---|---|
| 70 | 33.0 | |
| 72 | 47.0 | |
| 74 | 470 | |
| 76 | 4.7 K | |
| 79 | 8.2 | |
| 81 | 33.0 | |
| 82 | 1.0 | |
| 84 | 120 | |
| 87 | 1.0 K | |
| 89 | 33 | |
| 90 | 330 | |
| Variable resistors: | | |
| 34 | 20.0 K | (A type) |
| 75 | 75.0 | (B type) |
| Capacitors: | | |
| 37 | 430 PF | |
| 40 | 680 PF | |
| 50 | 320 PF | |
| 51 | 33 μF | |
| 52 | 33 PF | |
| 55 | 100 PF | |
| 58 | 33 μF | |
| 61 | 47 PF | |
| 62 | 33 PF | |
| 68 | 33 μF | |
| 69 | 10 μF | |
| 71 | 0.1 μF | |
| 73 | 220 μF | |
| 77 | 10 μF | |
| 78 | 150 PF | |
| 83 | 47 μF | |
| 86 | 0.15 μF | |
| 91 | 220 μF | |
| 92 | 47 μF | |
| Inductors: | | |
| 38 | 18 mH | |
| 43 | 56 μH | |
| 85 | 680 μH | |

Furthermore, the capacitance value of the capacitor 37 and the inductance value of the inductor 38 are so selected as to trap the high frequency biasing frequency (55 KHz in this embodiment).

While it is desirable to reduce the capacitance value of the capacitor 36 at the time of opening of the switch 24 as much as possible from the viewpoint of blocking the recording signal, this value in actual practice is subject to a limitation because there is a limitation to the inductance value (which is several tens of mH) of the inductor adapted for use in the tape recorder.

Figure 5:
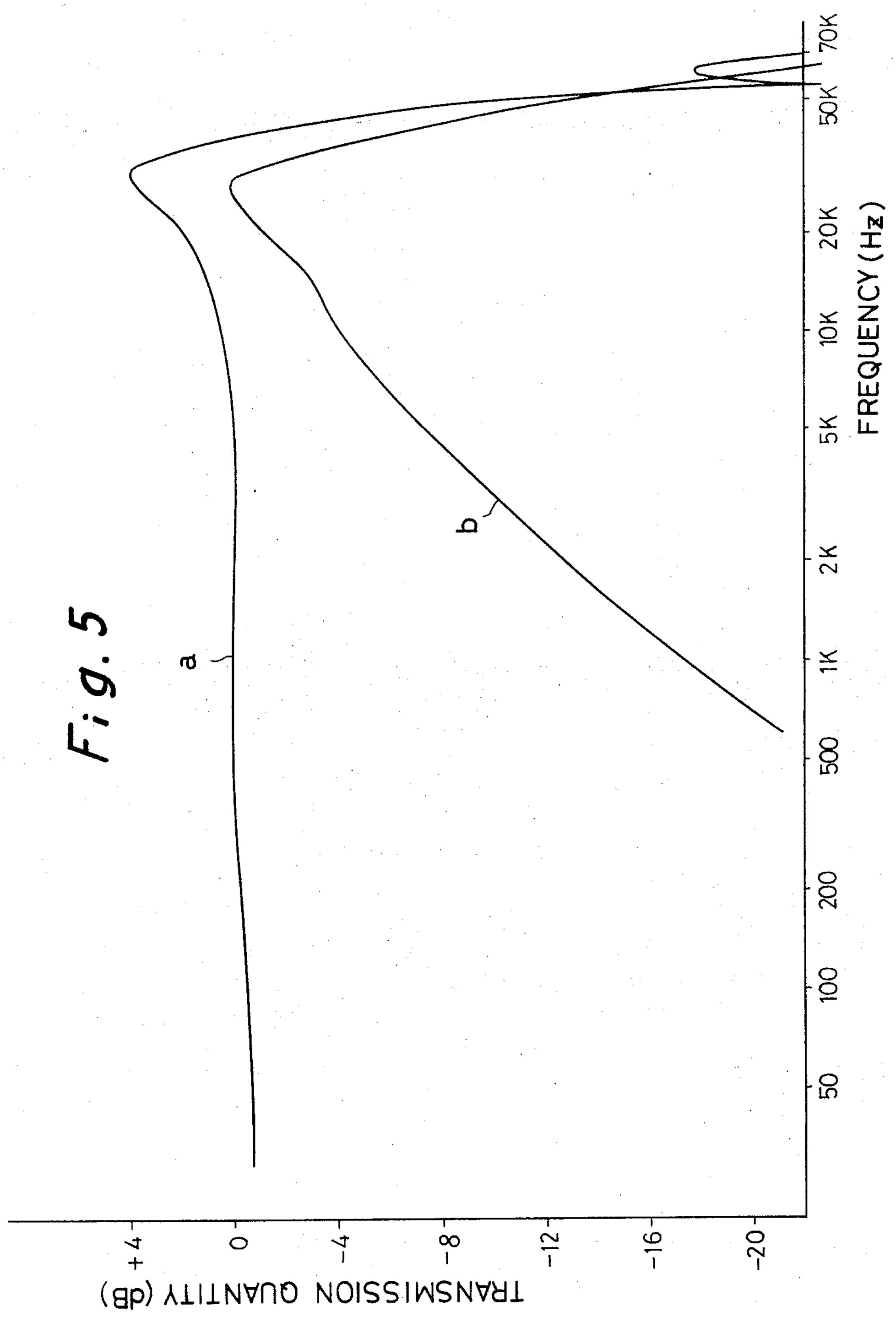
FIG. 5 is a graphical representation indicating the transmission characteristics of the recording signal transmission path of the circuit shown in FIG. 4.

The frequency characteristics of the circuit shown in FIG. 4 using the circuit elements with the constants as listed previously are indicated in FIG. 5. Curve (a) in FIG. 5 indicates the frequency response of the circuit when the switch 24 is closed, and the trap circuit 36 functions as a proper high frequency biasing signal trap circuit. Curve (b) indicated the frequency response of the circuit when the switch 24 is opened during the recording stopping period, and the trap circuit consists of only the capacitor 37 and functions as a recording stopping circuit.

As will be apparent from the curve (b), low and medium frequency signals in the audio frequency range are greatly attenuated and, hence, are scarcely recorded, while high frequency signals in the audio frequency range (20 KHz at most) are also attenuated and slightly recorded. Consequently, the amount of signals recorded during the recording stopping operation remains extremely small as a whole. It can be said that under this circumstance, recording is virtually suspended during the recording stopping operation. Further, there is no possibility of the occurrence of noise, which was inevitable with the conventional recording stopping device, resulting in an ideal recording stopping state.

I claim:

1. A device for cutting off a recording signal at the end of a recording operation in a tape recorder comprising, a recording amplifier, an information signal source connected to the input of said recording amplifier, a magnetic recording head, high frequency bias means connected to said magnetic recording head, high frequency bias trap means connected between said recording amplifier and magnetic recording head wherein said bias trap means consists of a parallel resonant circuit having an inductor and a capacitor, switching means connected in series with said inductor, and switch actuating means which closes said switch means during recording and opens said switch means at the end of the recording operation.

2. The device for cutting off a recording signal as defined in claim 1 wherein said parallel resonant circuit has a frequency response capable of interrupting the passage of the high frequency bias signal from said high frequency bias means and permitting the pasage of the recording signal when said switch means is closed, and when said switch means is opened the frequency response of said parallel resonant circuit becomes capable of interrupting the passage of the recording signal.

3. A device for cutting off a recording signal at the end of the recording operation in a cartridge type tape recorder comprising, a recording amplifier, an information signal source connected to the input of said recording amplifier, a magnetic recording head, high frequency bias means connected to said magnetic recording head, high frequency bias trap means connected between said recording amplifier and magnetic recording head having a first stage and second stage frequency response wherein said first stage is capable of interrupting the passage of the high frequency bias signal from said high frequency bias means and permitting the passage of the recording signal, and said second stage is capable of interrupting said recording signal, switch means for switching said high frequency bias trap means from said first stage to said second stage, and switch actuating means which actuates said switch means to switch said high frequency bias trap means from said first stage to said second stage at the end of the recording operation.

4. The device as defined in claim 3 wherein said high frequency bias trap means consists of a parallel resonant circuit including an inductor and a capacitor, said switching means is connected in series with said inductor, and said switch actuating means closes said switch means during recording and opens said switch means at the end of the recording operation.

* * * * *